C. C. ANDERSEN.
VALVE FOR CONTROLLING THE FLOW OF FUEL TO CARBURETERS AND FOR STRAINING SUCH FUEL.
APPLICATION FILED MAR. 1, 1915.
1,169,226. Patented Jan. 25, 1916.
2 SHEETS—SHEET 1.
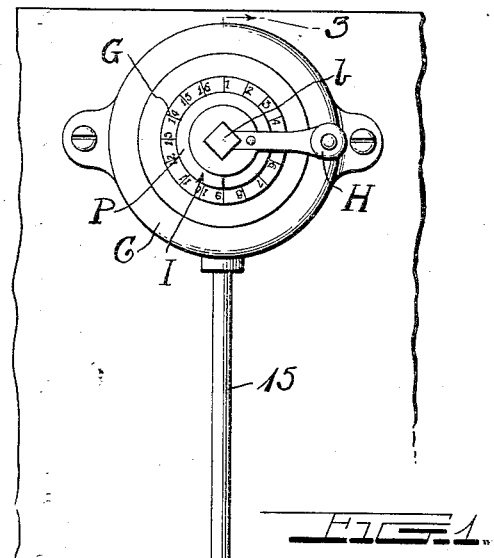
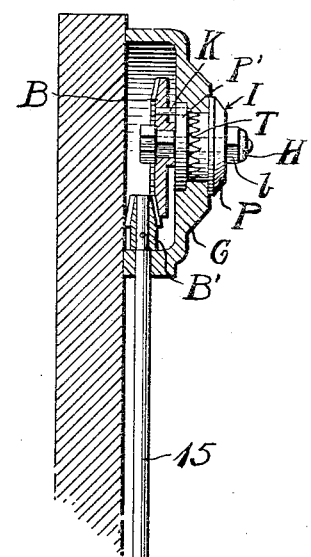
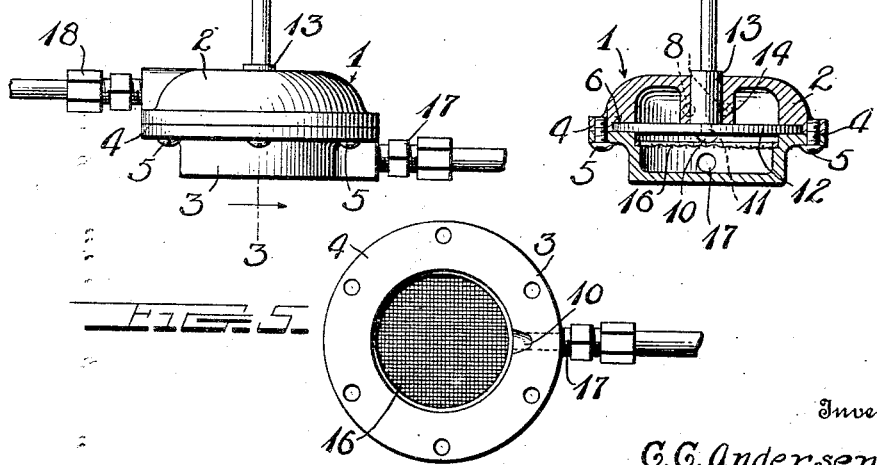
Inventor
C. C. Andersen
Witnesses

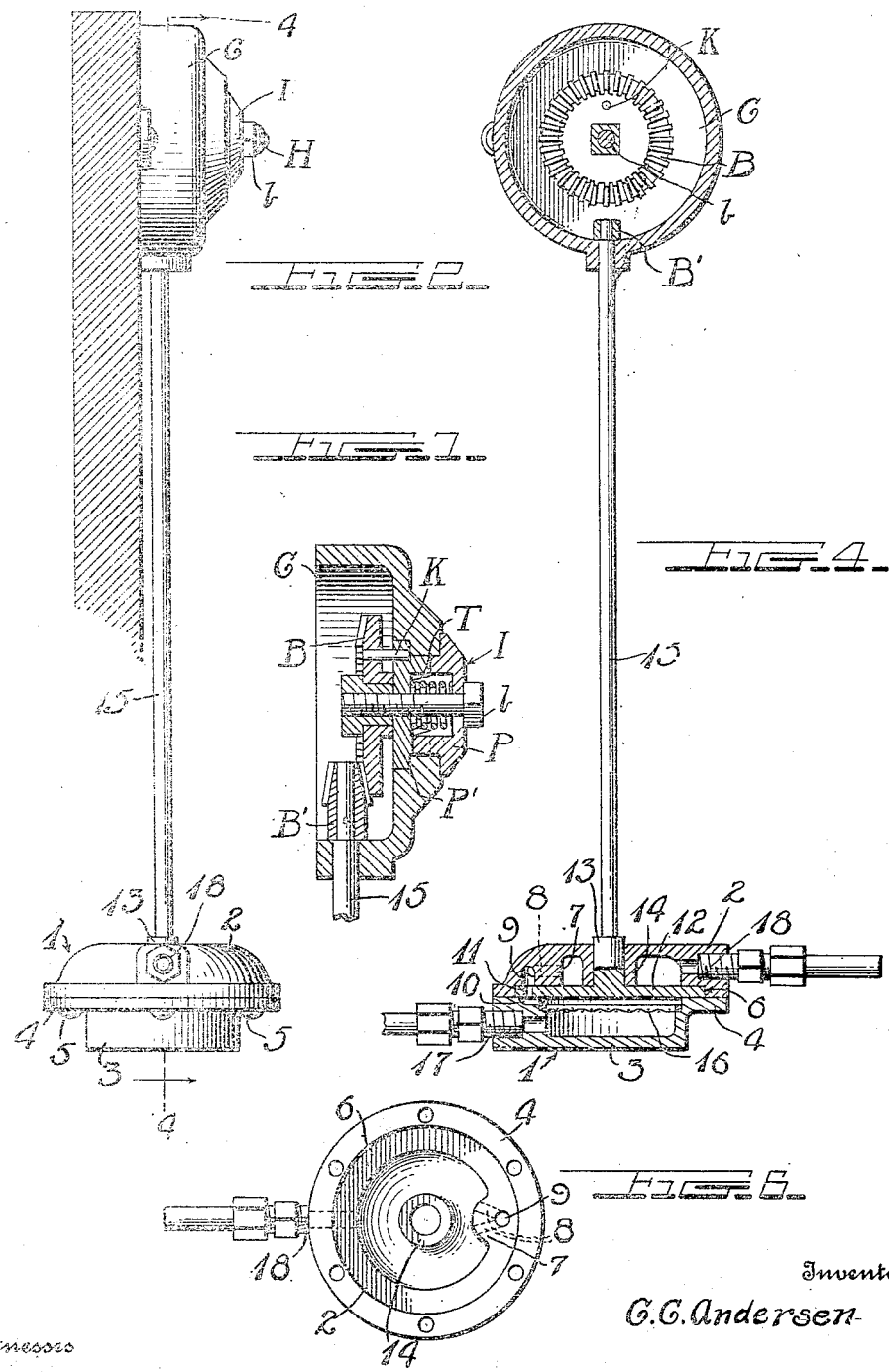

UNITED STATES PATENT OFFICE.

CHRISTIAN C. ANDERSEN, OF DAVENPORT, IOWA, ASSIGNOR OF ONE-FOURTH TO SAM NORGORDT AND ONE-FOURTH TO PETER O. PAASKE, BOTH OF DAVENPORT, IOWA.

VALVE FOR CONTROLLING THE FLOW OF FUEL TO CARBURETERS AND FOR STRAINING SUCH FUEL.

1,169,226.  Specification of Letters Patent.  Patented Jan. 25, 1916.

Application filed March 1, 1915. Serial No. 11,365.

*To all whom it may concern:*

Be it known that I, CHRISTIAN C. ANDERSEN, a citizen of the United States, residing at Davenport, in the county of Scott and State of Iowa, have invented certain new and useful Improvements in Valves for Controlling the Flow of Fuel to Carbureters and for Straining Such Fuel; and I do declare the following to be a full, clear, and exact description of the invention, such as will enable others skilled in the art to which it appertains to make and use the same.

My invention relates broadly to improvements in valves, but more particularly to a combined valve and strainer for use in the supply pipe leading from the fuel tank to the carbureter of an internal combustion engine. Heretofore, it has been common practice to provide two independent devices for accomplishing this result; namely, a valve for controlling the supply of fluid, which valve may or may not be equipped with a lock, and a screen secured in an independent casing and adapted to strain the fuel before its entrance into the carbureter.

It is the object of my invention, however, to so construct the valve as to provide for the straining of the fuel, thus removing any deleterious matter therefrom, to construct the device in a manner to prevent clogging of the straining screen, and to equip such device with a reservoir which is normally filled with the strained fuel, thus insuring the replenishing of fuel in the carbureter float chamber, as such replenishing becomes necessary. Needless to say, it is highly advantageous to have at hand a body of fuel which has previously been strained, for the purpose of so replenishing the supply in the float chamber, rather than necessitating the straining of such fuel on its way to said chamber.

With this general object in view, the invention resides in certain novel features of construction and combination hereinafter more fully described and claimed and shown in the drawings wherein:

Figure 1 is a side view of the valve constructed in accordance with my invention and showing a front elevation of the operating means with which the same is preferably provided; Fig. 2 is a side elevation taken at right angles to Fig. 1; Fig. 3 is a vertical tranverse section as seen along the plane of the line 3—3 of Fig. 1; Fig. 4 is a similar view as seen along the plane indicated by the line 4—4 of Fig. 2; Fig. 5 is a top plan view of the lower section of the valve casing; Fig. 6 is a bottom plan view of the upper section thereof; and Fig. 7 is an enlarged detail vertical section through the parts seen at the upper end of Fig. 3.

In these drawings, constituting a part of the application, the numeral 1 designates the casing of the improved valve, this casing being formed of an upper inverted cup-shaped section 2 and a lower cup-shaped section 3, the two sections having laterally extending annular flanges 4 which are secured together by screws or bolts 5. In the present instance, the lower edge of the upper section 2 is shown as provided with an annular valve seat 6 into which its inner side wall merges, said wall being provided at an appropriate point with a boss 7 through which a pair of ports 8 is formed, the inner ends of these ports registering with an upright port 9 which is formed in the upper side of the valve seat 6, while directly below and alined with this port 9, the upper edge of the lower section 3 is provided with an annular port or notch 10 which leads from the interior of said section 3 to the seat 6. Under normal circumstances, when the valve is in use, communication is established between the two ports 9 and 10 by a third port 11 which is formed through a horizontally disposed valve disk 12, this disk being disposed in the seat 6 and having an upstanding hub 13 which projects through a boss 14, the latter being formed on the inner side of the section 2 as clearly disclosed in Fig. 4. The hub 13, is in turn provided with an upright shaft 15 which rises therefrom and which is connected to operating means yet to be described. Immediately below the port 10, the lower casing section 3 is provided with a horizontal screen 16, and directly below this partition, an inlet 17 discharges into said section, while the upper section 2 is provided with an outlet 18 located at an appropriate point. By this disposition of parts, and the construction and location of the numerous features heretofore described, it will be evident that fuel will flow into the lower section 3 through the pipe 17, this section then constituting an unstrained fuel reservoir. As the fuel rises through the screen 16, however, all deleterious matter will be removed from said fuel, and, if the valve disk 12 is disposed in the proper position, the strained fuel will rise through the alined ports 10, 11, 9, and 8 into the upper section 2 which constitutes a strained fuel reservoir. From this reservoir, the purified fuel is then conveyed to the float chamber of the carbureter through the outlet pipe 18. It will therefore be evident that an appreciable volume of strained fuel is maintained in the valve casing at all times, whereby such fuel may be immediately supplied to the float chamber of the carbureter when this becomes necessary. Furthermore, it will be evident that the lower section or reservoir of the casing, replenishes the supply of fuel in the upper reservoir, as such supply is partially exhausted from time to time.

Particular emphasis is laid upon the provision of the two reservoirs above described and discussed, in view of the advantages derived therefrom, and the disposition of the screen 16 within the lower reservoir is likewise deemed a salient feature of the invention since by this arrangement of parts, an independent screen casing is unnecessary, it being evident that the valve casing acts not only as a housing for the valve disk, but likewise as a housing for the screen. Furthermore, by locating the screen within a body of fluid, splashing of the latter as the vehicle equipped with the device is propelled over the roadway, will effectively prevent the various particles of matter checked by the screen 16, from wedging therein, or in other words, will prevent said screen from clogging. Although any appropriate means could be provided for removing the deleterious matter collected in the lower reservoir, the screen 16 is preferably made removable for this purpose, whereby disconnecting of the two sections 2 and 3 will allow said screen to be removed, thus giving access to the lower reservoir for the above named purpose.

In order that unauthorized persons may not be allowed to open the valve for the purpose of allowing fuel to be fed to the carbureter, I preferably employ the means illustrated at the top of Figs. 1, 2, and 3, this means comprising an appropriate casing C into the lower side of which the shaft 15 extends, said casing being adapted to be secured to a suitable part of an automobile by any preferred means and being here shown as having an annular series of graduations G on its front face. These graduations coact with an indicating member I which is formed of an outer part P and an inner part P', the two parts being disposed end to end and having teeth T on their abutting faces. These teeth are held in mesh by a bolt $b$ which passes through the two parts P and P', through a suitable crank or handle H, and through a bevel gear B which is keyed to the inner part P' of the member 1, by the provision of a pin K or otherwise. Keyed to the upper end of the shaft 15, is a bevel pinion B' which meshes with the gear B. By this means, it will be evident that actuation of the handle H will rotate the valve disk 12, but it will likewise be evident that the various ports will aline only when said disk is stopped at a predetermined point. Since this point is known only to the legitimate operator or operators of the vehicle, it will be evident that unauthorized persons cannot open the valve. Furthermore, should it become expedient from time to time, the bolt $b$ may be loosened and the outer part P of the member I may be turned a fraction of a revolution, in respect to the part P', after which said bolt is again tightened. By this adjustment it will be evident that the position of the handle which would previously open the valve, will no longer produce this result, but that it must be positioned at another point.

From the foregoing description, taken in connection with the accompanying drawings, it will be seen that a very simple device has been provided for carrying out the object of the invention, yet that the efficiency of such device will not be impaired by such simplicity.

I claim:

1. A valve comprising a casing having a cup-shaped reservoir in its lower end and an annular valve seat at the upper end of said reservoir, a port leading from said upper end of the reservoir to one side of the seat, an additional port alined with the aforesaid port and leading from the opposite side of the seat, a rotatable valve disk in said seat and having a port adapted to register with the aforesaid ports, an inlet into the reservoir, and a screen extending across said reservoir and disposed between the inlet and the port therein.

2. A valve comprising a casing having upper and lower fuel reservoirs, and an annular valve seat between the two, an inlet into the lower reservoir and an outlet from the upper reservoir, a horizontal screen extending across the lower reservoir above the inlet, a port above the screen and leading from the lower reservoir to the valve seat, an additional port leading from the seat to the upper reservoir and alined with the aforesaid port, and a rotatable valve disk in the seat and having a port adapted to establish communication between the two aforesaid ports when the disk is rotated to a predetermined point.

3. A valve comprising a flat circular casing formed of a lower cup-shaped section having in a plane below its upper edge a horizontal liquid straining screen, a liquid inlet into said lower section below the screen, the upper edge of said section being formed with a groove extending laterally from the interior of said section, an upper inverted cup-shaped section having its lower edge secured in contact with the upper edge of the lower section, the interior diameter of said upper section being increased at its lower extremity to form a circular valve seat, the curved wall of said upper section being formed with a port leading from a point on the seat above the aforesaid groove into the interior of said section, a hollow boss depending centrally from the top of said upper section, a horizontal valve disk in the seat and contacting with the upper edge of the lower section, said disk having a port for registration with the aforesaid port and groove, an integral hub rising from said disk through the boss, a shaft secured to said hub, and a liquid outlet from the upper section.

In testimony whereof I have hereunto set my hand in presence of two subscribing witnesses.

CHRISTIAN C. ANDERSEN.

Witnesses:
OTIS GILBRECH,
W. W. HASTEN.

Copies of this patent may be obtained for five cents each, by addressing the "Commissioner of Patents, Washington, D. C."